United States Patent Office 2,748,144
Patented May 29, 1956

2,748,144
PROCESS FOR PREPARING ARYL THIOPHENES

Thomas Kenneth Hanson, Drayton, near Abingdon, and Leonard Matthew Kinnard, Appleby, near Scunthorpe, England, assignors to Esso Research and Engineering Company, a corporation of Delaware No Drawing. Application January 17, 1952, Serial No. 267,014

Claims priority, application Great Britain January 22, 1951

5 Claims. (Cl. 260—329)

The present invention relates to the synthesis of organic compounds and relates more particularly to the preparation of cyclic organic sulphur compounds by the catalytic reaction of sulphur with organic compounds containing olefinic unsaturation.

The reaction of sulphur with certain organic compounds is well known, the best known example being the vulcanization of rubber. Natural rubber has the molecular structure of a linear polymer of isoprene

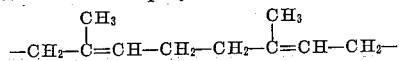

and reacts with sulphur to form cros-linkages whose structure is uncertain. It was originally assumed that it was a simple reaction forming a sulphide link across the double bonds, but the greater complexity of the reaction is established by the fact that even very highly cured rubbers such as ebonite still contain residual unsaturation even though their sulphur content may be sufficient to provide two sulphur atoms per double bond.

Accelerators are commonly used to assist in the vulcanization process. The earliest accelerators were free organic bases such as aniline and their addition compounds with carbon disulphide, but more recently ultra accelerators such as mercaptobenzothiazole and tetramethyl thiuram disulphide have been developed. Such accelerators have also been used in the vulcanization of synthetic rubbers such as low temperature copolymers of mono-olefins and diolefins. In such copolymers the residual unsaturation is a function of the diolefin content and is normally very much less than in the case of natural rubber. The precise mechanism of the curing or vulcanization reaction is no more certain in the case of such synthetic rubbers than it is with natural rubber, but in both cases the presence of a substantial amount of unsaturation seems necessary. Thus pure polyisobutylene of rubbery consistency does not cure with sulphur, while the incorporation of 2 or 3% of butadiene or isoprene into the molecule gives the so-called butyl rubber which cures readily with sulphur in the presence of an accelerator.

Another example of the reaction of sulphur with hydrocarbons is the preparation of p-cymene from terpenes such as dipentene. This involves dehydrogenation and molecular rearrangement, the basic reaction being as shown below:

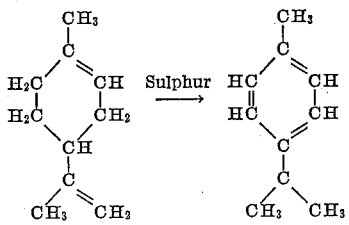

While the reaction proceeds to some extent on heating with sulphur alone, it is increased both in speed and in yield by the additional use of an accelerator such as tetramethyl thiuram disulphide or mercaptobenzothiazole.

It is also known that mono-olefins such as styrene will react to a limited extent on heating with elemental sulphur to give cyclic sulphur compounds of the thiophene family. The reaction is slow and yields are very poor.

It has now been discovered in accordance with the present invention that the reaction of sulphur with some olefinic materials to form cyclic sulphur compounds is greatly improved in both speed and yield by the use as a catalyst of a small amount of a vulcanization accelerator. The reaction is considered to follow the equation:

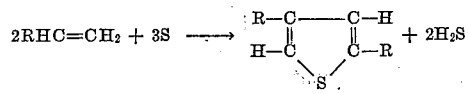

in which the various R's represent hydrocarbon radicals with or without substituent groups inert to the reaction. The unexpected nature of this reaction will be apparent on contrasting it with the vulcanization reaction referred to in which the evolution of hydrogen sulphide is small in the absence of and negligible in the presence of an accelerator, and also with the reaction with terpenes, in which as in the present case there is copious evolution of hydrogen sulphide, but in which the reaction products consist of aromatic hydrocarbons and a complex sulphurised product of indeterminate structure which has found use as an additive for mineral lubricating oils. In contrast to these indeterminate sulphurisation reactions of the prior art, the catalysed reaction of the present invention seems to proceed predominantly along the lines of the equation given above to give a specific thiophene product in good yield. Thus styrene on heating with sulphur in the presence of a small amount of mercaptobenzothiazole gives a good yield of diphenylthiophene

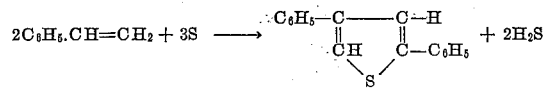

The 2.4 isomer preponderates in the reaction products, although minor amounts of the other isomers, principally the 2.3 are also present.

The vulcanization accelerators which can be used in the process of the invention are well known in the art and are well listed and identified in the literature. See for example "Modern Rubber Chemistry," by Harry Barron (Hutchinson, 2nd edition, 1947). Among the commonest compounds used are nitrogen bases and their derivatives and organic sulphur compounds.

Thus aniline was one of the earliest compounds discovered to act as an accelerator and while free bases such as ammonia, xylidine, toluidine and the like may be used, the modern practice is to use condensation products of aldehydes and ammonia or amines. Examples of such products are hexamethylene tetramine, butyraldehyde-aniline, acetaldehyde-aniline, acetaldehyde-toluidine and other condensation products of lower aldehydes and aromatic amines.

Another class of suitable nitrogen bases is the family of guanidines, in particular the aromatic substituted guanidines which may be exemplified by diphenyl guanidine

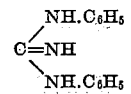

Other examples are triphenyl guanidine, di-o-tolylguanidine and dixylyl guanidine.

The widest class of accelerators consists of sulphur compounds the majority of which may be regarded as carbon disulphide derivatives containing the grouping

Typical members of this class are set out in tabular form below, together with structural formulae in which the various R groups represent organic radicals, normally alkyl groups, or hydrogen.

1. Thioureas

2. Mercaptans

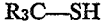

3. Thiophenols

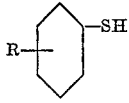

4. Dithiocarbamates

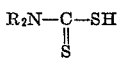

5. Trithiocarbonates

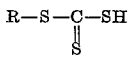

6. Xanthates

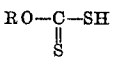

7. Dithio acids

8. Mercaptothiazoles

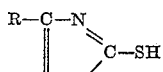

9. Mercaptobenzothiazoles

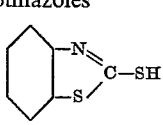

10. Thiuram disulphides

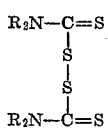

Specific examples of suitable materials are xylyl mercaptan (a thiophenol), zinc dimethyl dithiocarbamate, zinc dibutyl dithiocarbamate, piperidine pentamethylene dithiocarbamate, zinc butyl xanthate and mercaptobenzothiazole.

In general it is preferred to use the so-called ultra-accelerators (i. e., ones which promote very rapid vulcanization) but from a practical angle the selection of the catalyst is dictated by commercial availability and economics.

The amount of catalyst used is small, being of the order of 1% by weight or less based on the sulphur, although larger amounts can, of course, be used without reaping any corresponding advantage. The amount of sulphur employed is not critical although to obtain the maximum yield of thiophene it should be at least stoichiometrically equivalent to the olefin. The reaction is highly exothermic and may be carried out in the presence of an inert diluent such as a paraffinic hydrocarbon fraction if desired. If a diluent is used it is advantageous to select one of boiling range substantially different from that of the product thiophene so as to facilitate working up of the product.

The actual operation of the reaction is simple, consisting as it does in raising the temperature of the mixture of catalyst, sulphur, olefin and diluent if used to a point where vigorous evolution of hydrogen sulphide occurs and then maintaining the mixture at reaction temperature (which will vary for different olefins but is generally within the range 50–200° C.) until the reaction is complete. This may be achieved in a variety of ways. Thus the whole or the reactants may be mixed together initially and the reaction controlled by judicious cooling once it has started. Alternatively a part only of the sulphur or the olefin may be included in the initial mixture, the remainder being added batchwise or gradually as the reaction proceeds. Yet another method is to use a controlled amount of a volatile diluent, the reaction vessel being fitted, of course, with a reflux condenser, and the excess heat of reaction being absorbed by the boiling and refluxing of the diluent. It is convenient to base the sulphur used in the reaction on the molecular weight of the reacted organic compound. Thus for a compound having two conjugated ethylenic double bonds between non-tertiary carbon atoms, 2 moles of sulphur are used, otherwise 1½ moles may be used. The reactions may be terminated on the production of one mole of hydrogen sulphide. It will be appreciated that these figures may be varied somewhat giving a preponderance of one or other reactant or giving a partially converted product.

Thus the first requirement of the material is that it should contain an ethylenic double bond between two non-tertiary carbon atoms, since in the absence of a hydrogen attached to each of these carbon atoms, the dehydrogenation and ring closure indicated in the equation given earlier will not occur. One carbon atom must be a terminal carbon atom. It is preferred to use mono-olefins but two ethylenic double bonds are permissible, so long as one or both of them is between two non-tertiary carbon atoms. In this embodiment of the invention it is preferred to use conjugated diolefins such as butadiene or isoprene. In the case of butadiene it is suggested that ring closure of the single molecule occurs, with elimination of $H_2S$, thus

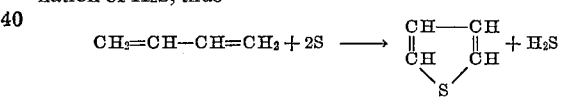

whereas isoprene will give a thiophene with unsaturated substituents, thus:

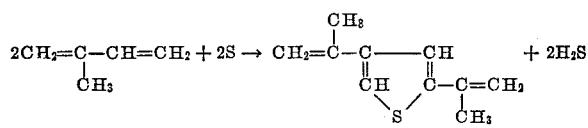

Irrespective of the correctness of this suggested reaction, the fact remains that a vigorous reaction does occur when mono- or di-olefins of the character described are heated with sulphur in the presence of a catalyst according to the present invention, which accordingly in its broad scope covers the method of producing organic sulphur compounds by heating a hydrocarbon or inertly substituted hydrocarbon containing not more than two ethylenic double bonds joining non-tertiary carbon atoms with sulphur in the presence of a vulcanisation accelerator, and this scope is not limited by the correctness or otherwise of any reaction theory put forward.

Thus this invention comprises a process for the production of thiophene derivatives wherein sulphur, in the presence of a rubber vulcanisation inhibitor, is reacted with an organic compound of the formula $RCH=CH_2$ where R is a hydrocarbon or a hydrocarbon having substituent groups that are inert under the reaction conditions and wherein R contains at least one carbon atom.

Other preferred limitations may be imposed on the olefinic materials. Thus it is desirable that the molecular weight should not be excessively high, aliphatic olefins of up to about 20 carbon atoms and aromatic olefins of up to about 30 carbon atoms being a reasonable practical upper limit.

Considering the aliphatic olefins propylene

and butene-1

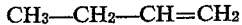

are suitable whereas isobutylene

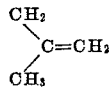

is not. Other conveniently available olefins are the lower polymers or copolymers (dimers, trimers and tetramers) of the C₃ and C₄ olefins and olefins derived by cracking relatively long chain hydrocarbons such as paraffin wax. Such cracked wax olefins will contain a mixture of olefins some suitable for the present process and some not, and this fact should be borne in mind since difficulties may be encountered in working up the product should this be desired.

Suitable aromatic olefins may, for purposes of convenience, be regarded as based on styrene $C_6H_5.CH=CH_2$. Additional aliphatic carbon atoms may be present either as nuclear substituents as in the various methyl, ethyl and propyl styrenes, or in the unsaturated chain as in allyl benzene. Corresponding naphthyl derivatives may also be used as may di-aromatic olefins such as stilbene $C_6H_5.CH=CH.C_6H_5$.

Furthermore in any of these suitable olefins there may be present substituent groups which are inert under the reaction conditions, such as carboxyl, hydroxyl, halogen, nitro, alkoxy, aroxy and similar groups.

As previously stated, the primary object of the invention is the production of substituted thiophenes and when it is desired to recover individual thiophenes substantially pure, it is manifestly desirable to use single olefins as the starting material, since mixtures will give mixtures of different thiophenes of considerable complexity. Another point to be considered is the possibility of steric hindrance causing difficulty in the ring closure when the olefin has large groups on either side of the double bond. Thus styrene is converted to di-phenyl thiophene far more readily than stilbene to tetraphenyl thiophene. For this reason the most preferred group of starting materials may be defined as the mono-substituted ethylenes or vinyl compounds of the general formula $R.CH=CH_2$ in which R is a hydrocarbon or substituted hydrocarbon group as previously discussed. These will yield 2.4 di-substituted thiophenes. Specific examples of such materials include styrene, and the alkyl styrenes, such as methyl and di-methyl styrenes and the various propyl, butyl and amyl styrenes, and in the aliphatic series all the various alkene-1's (butene-1, pentene-1, hexene-1 and so forth).

To illustrate the invention still further details are given below of an experimental run carried out using styrene:

396 grams of styrene were refluxed for 7 hours with 96 grams of sulphur in the presence of 0.5 grams of mercaptobenzothiazole as catalyst. After the evolution of hydrogen sulphide had started, the reaction was self-sustaining and the flask was cooled at intervals to moderate the violence of the reaction. When the copious evolution of hydrogen sulphide was virtually over, the contents of the flask was steam distilled and the yellow crystalline solid obtained was recrystallised from acetone and then from alcohol.

About 250 grams of substantially pure 2.4 diphenyl thiophene were recovered, having a melting point of 124° C. and a boiling point of 377° C. Some decomposition occurred near the boiling point. The product was soluble in most common organic solvents such as acetone, alcohol, acetic acid, chloroform, carbon tetrachloride, petroleum ether and other petroleum fractions.

What we claim is:

1. A process for the production of thiophene derivatives which comprises reacting at elevated temperatures sulfur with an olefinic compound having the formula $RCH=CH_2$, wherein R represents a radical selected from the group consisting of phenyl and lower alkyl substituted phenyl, in contact with a rubber vulcanization accelerator and wherein about one mole of H₂S per mole of olefinic compound reacted is evolved during the reaction.

2. A process as defined in claim 1 wherein the mole ratio between the sulfur and said olefinic compound is about 1½:1.

3. A process as defined in claim 1, wherein the amount of vulcanization accelerator added is less than 1% by weight of the sulfur.

4. A process as defined in claim 1, wherein the olefinic compound is styrene.

5. A process as defined in claim 1 wherein said vulcanization accelerator is mercaptobenzthiazole and the temperature range is between 50°–200° C.

References Cited in the file of this patent

UNITED STATES PATENTS

| 2,446,072 | Armstrong | July 27, 1948 |
| 2,450,659 | Hansford | Oct. 5, 1948 |

OTHER REFERENCES

Glass: JACS 51:3430.

Schwarzkopf: Bull. Soc. Chim de France (5), vol. 2, pp. 64–9 (1935).

Baumann et al.: Deut. Chem. Ber. 28, 890–95 (1895).

Vanderbilt 1948 Rubber handbook, 9th ed., 1948, published by R. T. Vanderbilt Co.